United States Patent [19]

Purson et al.

[11] Patent Number: 5,142,214

[45] Date of Patent: Aug. 25, 1992

[54] SYNCHRONOUS MOTOR HAVING SELECTABLE ROTATION DIRECTION

[75] Inventors: Hervé Purson; Denis Girardin, both of Drôme, France

[73] Assignee: Sextant Avionique (Societe Anonyme Francaise), Meudon la Foret, France

[21] Appl. No.: 807,635

[22] Filed: Dec. 13, 1991

Related U.S. Application Data

[63] Continuation of Ser. No. 414,025, Sep. 28, 1989, abandoned.

[30] Foreign Application Priority Data

Oct. 4, 1988 [FR] France ................................ 88 12946

[51] Int. Cl.$^5$ ............................................. H02P 1/40
[52] U.S. Cl. .................................... 318/722; 318/778; 318/284
[58] Field of Search .............................. 318/720–723, 318/786, 778, 779, 749, 284, 285

[56] References Cited

U.S. PATENT DOCUMENTS 4,251,758 2/1981 Pedersen et al. ..................... 318/254
4,409,532 10/1983 Hollenbeck et al. ................ 318/786
4,641,066 2/1987 Nagata et al. ........................ 318/138

FOREIGN PATENT DOCUMENTS 61-240868 10/1986 Japan.

Primary Examiner—David Smith, Jr.
Attorney, Agent, or Firm—Stevens, David, Miller & Mosher

[57] ABSTRACT

A synchronous motor is divulged whose direction of rotation may be chosen, comprising a rotor with permanent magnet and a stator with homopolar field, including a winding fed with an AC voltage. In response to a stopping order, a circuit controls the switch for opening the connection of the winding when the voltage is decreasing in absolute value or is cancelled out and stores the sign of its slope at the time of opening. The circuit controls the switch for closing the connection when the voltage is cancelled out or is increasing in absolute value, with a sign slope identical to, respectively opposite, the stored sign, in accordance with an order for setting in rotation in a direction identical to, respectively opposite, the preceding direction of rotation.

4 Claims, 5 Drawing Sheets

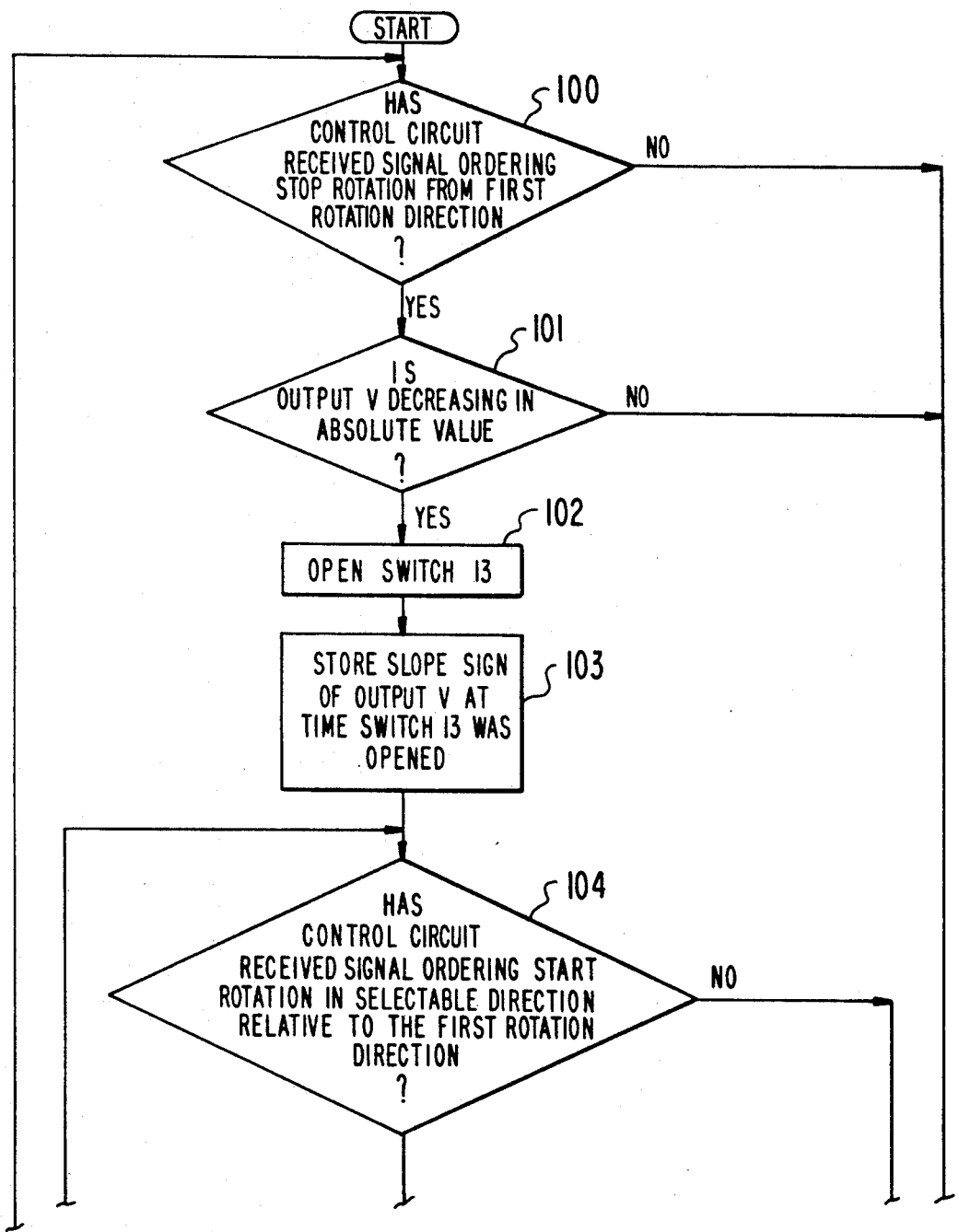

SYNCHRONOUS MOTOR HAVING SELECTABLE ROTATION DIRECTION

This application is a continuation of application Ser. No. 414,025, filed Sep. 28, 1989 now abandoned.

BACKGROUND OF THE INVENTION

The present invention relates to a synchronous motor comprising a rotor with permanent magnet and a stator with a homopolar field having a winding connected to an AC voltage source.

This type of motor is a small low cost power motor used more particularly in the home electric appliance field.

Such motor has the drawback of not having a predetermined direction of rotation and of starting either in one direction or in the other, in a random fashion, unless special precautions are taken.

For the majority of applications of such motors, such uncertainty concerning the direction of rotation is not tolerable. One prior art solution is to provide, on such a motor, a mechanical device, e.g. a pawl, for imposing a given direction of rotation on the rotor.

However, the use of a pawn in this manner limits the use of the motor for applications in which, once installed, it has to rotate in one direction only. Now, in numerous applications, it is convenient to be able to drive a member at will either in one direction or in the other, this choice being made through an electric control signal. In such applications, the known synchronous motor, with its pawl, is not usable.

SUMMARY OF THE INVENTION

The object of the present invention is to overcome the above drawback by providing a motor of the above defined type in which the direction of rotation may be controlled electrically.

For this, it provides a motor of the above defined type, characterized by the fact that it is provided with a controllable switch disposed between the source and the stator winding and a circuit for controlling the switch, adapted so as to:

in response to an order for stopping the rotation of the rotor and in response to the AC voltage, open the switch at a time when the AC voltage is decreasing in absolute value or is cancelled out and store the sign of the slope of the AC voltage at the opening time, and in response to an order for setting the rotor in rotation in a direction identical to, respectively opposite, that before the stopping, and in response to the AC voltage, close the switch at a time when the AC voltage is cancelled out or is increasing in absolute value, with a sign slope identical to, respectively opposite, the stored sign.

In the motor of the invention, because the energization ceases during a given phase of the AC voltage which produces it, and because it is re-established during another given phase of this AC voltage, the direction of rotation after stopping is not random, relative to the direction of rotation before stopping. And this direction may be chosen. Thus, with such a motor, it is therefore sufficient to determine a direction of rotation of the motor once, for example at the time when it is first set in motion, in order to be able to use it then as a motor with a controllable direction of rotation. This is an important advantage considering the simplicity and low cost of this type of motor.

Advantageously, the controllable switch is a triac.

For a triac, the opening occurs necessarily at the time when the current which flows therethrough is substantially zero. Since, for the type of motor discussed here, the resistive component of the impedance of the winding is relatively high, it may be considered that the phase shift between the AC voltage applied to the winding and the current which flows therethrough is small. In this case, the time of cancellation of the current is substantially the same as the time of cancellation of the voltage. The conditions of opening are well respected, without it being necessary for the circuit to effectively control the opening time of the triac. It is sufficient, as soon as the order for stopping is received, for the circuit to apply a zero voltage to the control electrode of the triac.

Again advantageously, the control circuit is adapted so as to apply to the winding, and before the first time that the rotor is set in rotation, a DC voltage of a value comparable to the effective value of the AC voltage, for a time comparable to the period of the AC voltage, in order to place the rotor reliably in a given position, in which the sign of the slope of the AC voltage after closure of the switch imposes the direction of rotation.

In this case, it is not necessary to determine, even a single time, a direction of rotation of the motor, to the extent that the DC voltage pulse which is applied thereto positions its rotor in a given position, in which the direction of setting in rotation is controlled by the slope of the voltage at the time of closure.

BRIEF DESCRIPTION OF THE DRAWINGS

The present invention will be better understood from the following description of the preferred embodiment of the motor of the invention and a variant thereof, with reference to the accompanying drawings in which.

DESCRIPTION OF THE PREFERRED EMBODIMENTS

Figure 1:
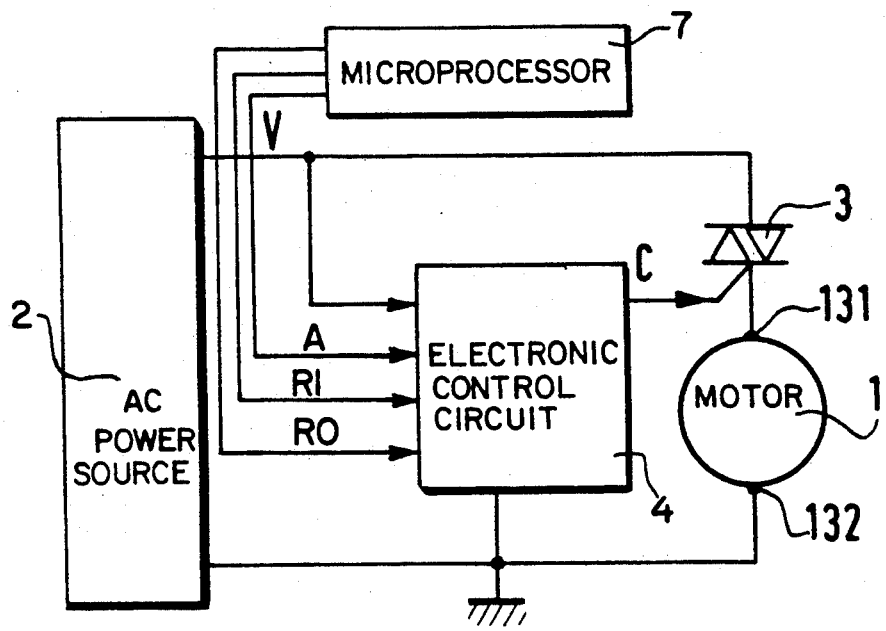
FIG. 1 is a block diagram of circuitry including a motor and the electric and electronic circuits required for its operation, in accordance with the invention.

Referring to FIG. 1, a synchronous motor 1 is connected to a source 2 of an AC voltage V through a controllable switch, in this case a triac 3.

Source 2 is here an AC voltage source of 220 Veff at 5 Hz, one of its terminals is connected to an electric ground, as well as to the terminals of the motor 1.

An electronic circuit 4 is provided with a terminal connected to ground, four input terminals receiving respectively the AC voltage V, and from microprocessor of a signal A, a signal RI and a signal RO and an output delivering a signal C applied to the control electrode of triac 3.

Signal A is a binary signal for controlling stopping of the rotation of motor 1 and signals RI and RO binary signals for controlling the setting in motion of motor 1.

In fact, and as will be better understood hereafter, circuit 4 is adapted for, when motor 1 rotates in response to a stopping order, stopping this motor 1 and, once the motor 1 is stopped, thereafter, in response to a setting in rotation order, causing it to start up again either in a direction identical to the one in which it was rotating before stopping or in an opposite direction, and that at the choice of the user.

The order for stopping the motor is shown, for example, by a high level pulse of signal A, normally at low level, this pulse being followed by stopping of the motor. Similarly, the order for setting in rotation in a direction identical to that before stopping is shown by a high level pulse of the signal RI, normally at the low level, whereas the order for setting in rotation in a direction opposite that before stopping is shown by a similar pulse of signal RO, normally at the low level.

Signals A, RI and RO are formed in a circuit of known type and not shown for the sake of simplicity, in response to the instructions of the user of the motor, or those coming from a microprocessor when, as may be the case, motor 1 is used in an automated system.

Figure 8:
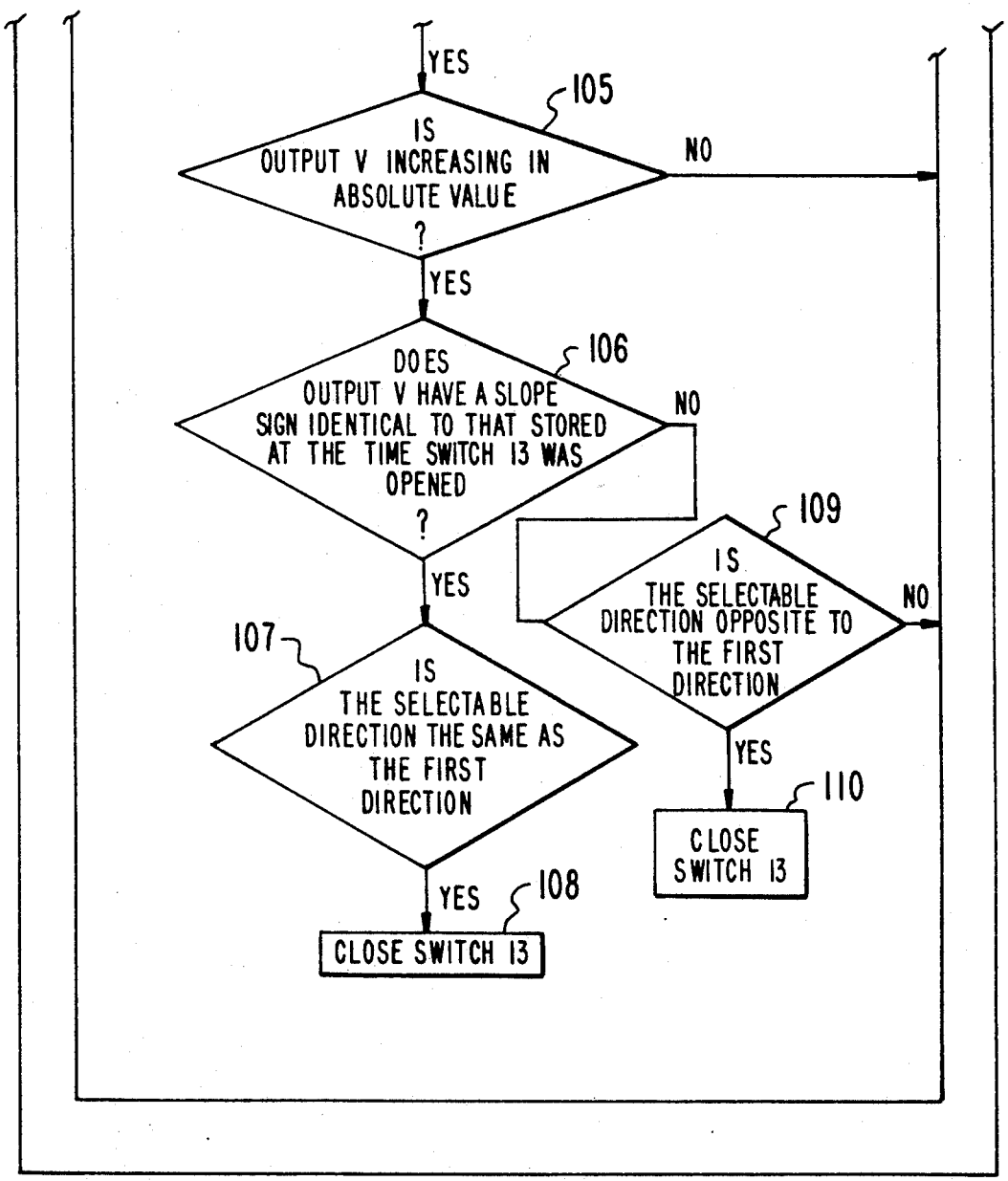
FIG. 8 contains a flow chart illustrating the operation of a control circuit according to the invention.

FIG. 8 contains a flow chart illustrating the operation of electronic control circuit 4 for controlling switch 13. As shown in FIG. 1, control circuit 4 generates control signals causing switch 13 to open and to close in response to various input signals A, RI and RO and output V from AC voltage source 2.

As shown by the flow chart, control circuit 4 controls opening and closing of switch 13 by generating control signals for causing switch 13 to open (step 103) in response to both a signal ordering stop rotation of the rotor from a first direction of rotation (step 100) and an output V from voltage source 2 which is decreasing in absolute value (step 101). In step 103, a sign of the slope of output V of voltage source 2 is storage at the time switch 13 is opened. Thereafter, switch 13 is closed (step 108) in response to (1) a signal ordering start rotation of the rotor in a selectable direction relative to the first direction of the rotor (step 104), (2) an output V of voltage source 2 which is increasing in absolute value (step 105), (3) output V has a slope sign identical to the stored sign In step 103 and (4) the selectable direction is identical to the first direction (step 107). Alternatively, switch 13 is closed (step 110) in response to (1) a signal ordering start rotation of the rotor in a selectable direction relative to the first direction of the rotor (step 104), (2) an output V of voltage source 2 which is increasing in absolute value (step 105), (3) output V has a slope sign opposite to the stored sign in step 103 and (4) the selectable direction is opposite to the first direction (step 109).

Figure 2:
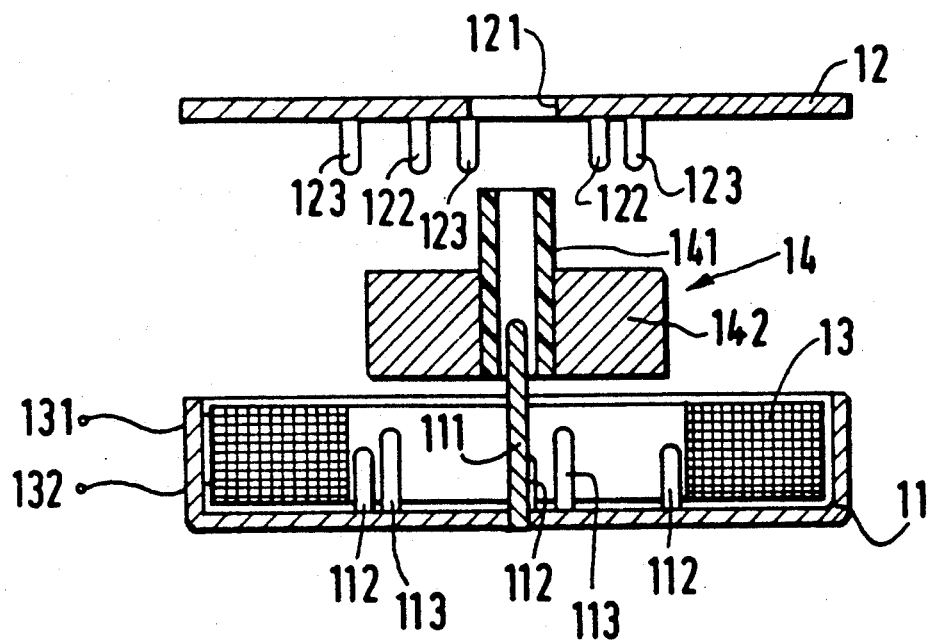
FIG. 2 is an exploded view in section of the rotor, of the stator and of a winding of the motor of FIG. 1.

Motor 1 is shown in section and in an exploded view in FIG. 2. A metal case comprising a bottom 11 and a lid 12 contains a stator winding 13 and a rotor 14 with permanent magnet.

Bottom 11 is in the form of a circular cylinder of small height with respect to its diameter, and it supports a circular cylindrical rod 111 which extends along its axis.

Rotor 14 comprises a sleeve 141, here made from a plastic material, which pivots about rod 111. A permanent magnet ring 142 is fast with sleeve 141. It comprises ten poles spaced evenly apart about its periphery, alternately North and South.

The bottom 11 supports five pairs of poles 112 and 113, disposed evenly about ring 142. Poles 112 and 113 are rods extending parallel to rod 111. The poles 112 have a length substantially equal to half the height of bottom 11, and poles 113 are longer.

The space between the pairs of poles 112 and 113 and the cylindrical wall of the bottom is filled by winding 13, having the same axis as bottom 11, whose two terminals 131 and 132 form the terminals of motor 1.

Lid 12 supports five pairs of poles 122 and 123, disposed evenly so as to be located about ring 142, in the gaps left free between the pairs of poles 112 and 113 of bottom 11, when lid 12 closes bottom 11.

Poles 122 and 123 are rods extending parallel to rod 111. Poles 122 and 123 are all of the same length, equal to that of poles 112.

The lid 12 if formed with a hole 121 for letting pass therethrough a part of sleeve 141 which thus forms the output shaft of motor 1.

Figure 3:
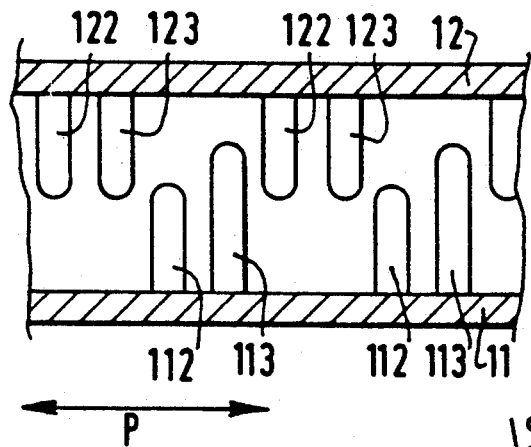
FIG. 3 shows the arrangement of the poles of the stator of the motor of FIG. 2.

FIG. 3 shows the relative position of poles 112, 113, 122 and 123, which succeed each other in this order and so on, when lid 12 closes bottom 11. Ring 142 is therefore surrounded here by twenty poles which can be grouped into five packets of four poles, having pole spacing P equal to 72°.

The stator of motor 1 thus comprises winding 13 and the five groups of four poles 112, 113, 122 and 123 supported by the bottom 11 and by lid 12, respectively.

Figure 4:
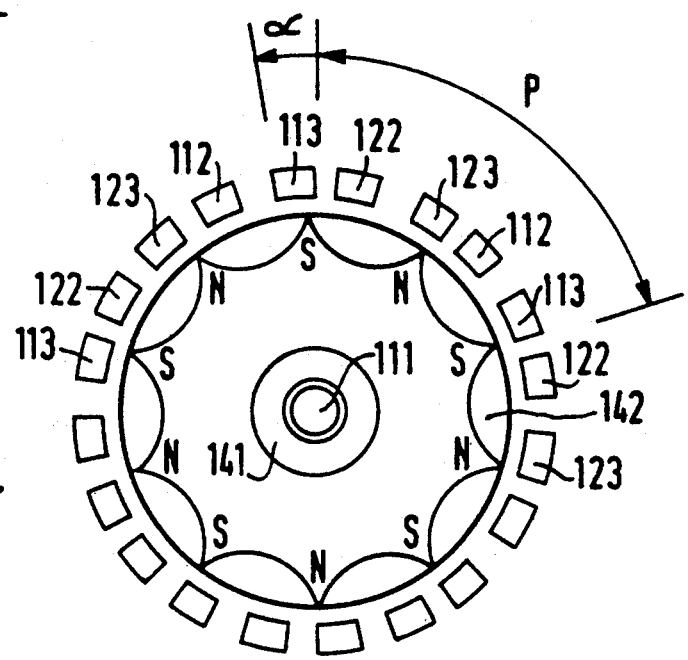
FIG. 4 shows a partial top view of the rotor and of the stator of the motor of FIG. 2, in a first rest position.
Figure 5:
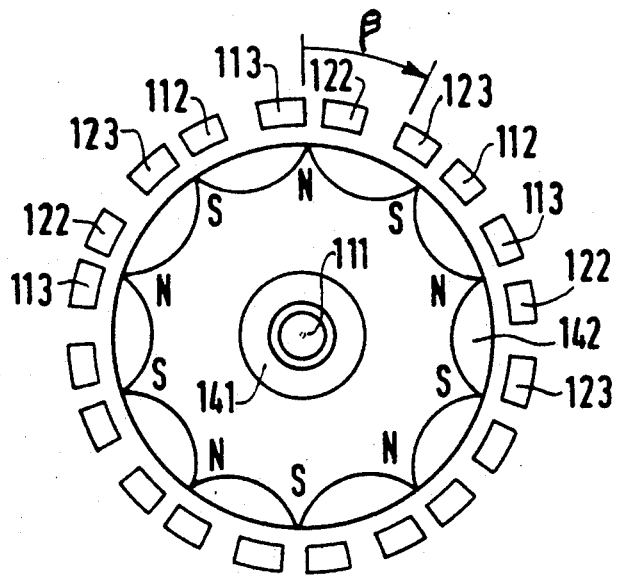
FIG. 5 shows a partial top view of the rotor and of the stator of the motor of FIG. 2, in a second rest position.

FIGS. 4 and 5 each show, on an enlarged scale, a top view of the ring 142 of rotor 14 and of poles 112, 113, 122 and 123.

FIG. 4 shows rotor 14 in a first possible rest position relative to the stator, when winding 13 is not energized. In this position, a South pole of ring 142 is disposed so as to confront the edge of the pole 113 the nearest to the adjacent pole 122.

FIG. 5 shows rotor 14 in a second possible rest position relative to the stator, when winding 13 is not energized. In this position, a North pole of ring 142 is disposed so as to confront the edge of the pole 113 the closest to the adjacent pole 122.

The first and second rest positions, which have just been described, are the only ones possible for rotor 14 relative to the stator, when winding 13 is not energized.

When winding 13 is energized by the AC voltage of frequency 50 Hz, each pair of poles 112 and 113 becomes alternatively North and South, whereas each pair of poles 122 and 123 becomes alternately South and North.

Because the effects of the asymmetry, introduced by pole 113, having a length greater than the other, poles are greater when winding 13 is energized than when it is not, the energization of winding 13 is necessarily followed by a movement of rotor 14 even if, immediately after such energization, pole 113 becomes North whereas rotor 14 is in the first position, shown in FIG. 4, or even if, immediately after such energization, pole 113 becomes South whereas rotor 14 is in the second position, shown in FIG. 5.

As soon as rotor 14 is thus set in motion, it continues to move under the effect of the magnetic forces brought into play and because of its own inertia, so that each of its North poles is always facing a South pole and conversely. Thus, the field of the stator seen by each of the poles of the rotor is homopolar and, during a period of 20 ms of the voltage V, the rotor rotates here through an angle equal to the pole spacing of 72°. The speed of rotation is therefore here ten revolutions per second.

As has already been mentioned, if no particular precaution is taken when the motor 1 is set in rotation and when it is stopped, its direction of rotation is random. In fact, when it is stopped, the rotor is either in the first position, shown in FIG. 4, or in the second position, shown in FIG. 5 and the direction in which it starts up when the voltage is re-applied depends both on the rest position in which it is situated and on the trend of the voltage V at the time of energization.

However, the Applicant has noted that, if care is taken to open the connection connecting winding 13 to source 2 of voltage V, at a time when the latter is decreasing in absolute value or is cancelled out, the rest position of rotor 14 after stopping depends only on the direction of rotation which was that of the rotor 14 before stopping and on the slope of the voltage V at the time of opening the connection.

Thus, and for example in the case where the positive half waves of the voltage V make poles 112 and 113 North and poles 122 and 123 South, rotor 14 is in the first position, shown in FIG. 4, in the following cases:

rotor 14 was rotating in the trigonometric direction and the slope of the voltage V at the time of stopping was positive, or the rotor 14 was rotating in the direction opposite the trigonometric direction and the slope of voltage V at the time of stopping was negative.

Similarly, rotor 14 is in the second position, shown in FIG. 5, in the following cases:

the rotor 14 was rotating in the direction opposite the trigonometric direction and the slope of voltage V at the time of stopping was positive, or rotor 14 was rotating in the trigonometric direction and the slope of voltage V at the time of stopping was negative.

Similarly, it appears that, if care is taken to close the connection which connects winding 13 to source 2 of voltage V at a time when the latter is cancelled out or is increasing in absolute value, the direction of rotation of rotor 14 depends on (1) the rest position of rotor 14 before closure of said connection and (2) the sign of the slope of voltage V at the time of closure of the connection.

Thus, and still keeping the same conventions, rotor 14 sets off in the direction opposite the trigonometric direction in the following cases:

rotor 14 was in the first rest position, shown in FIG. 4, and the slope of voltage V, at the time of closure, is negative, or rotor 14 was in the second rest position, shown in FIG. 5, and the slope of voltage V at the time of closure is positive.

Similarly, rotor 14 sets off in the trigonometric direction in the following cases:

rotor 14 was in the first rest position, shown in FIG. 4, and the slope of voltage V at the time of closure is positive, or rotor 14 was in the second rest position, shown in FIG. 5, and the slope of voltage V at the time of closure is negative.

It is clear from the preceding considerations that, with motor 1 rotating if care is taken to open the connection which connects winding 13 to source 2 at a time when voltage V is decreasing in absolute value or is cancelled out and if care is taken to store the sign of the slope at the time of opening, the setting in rotation of motor 1 can be controlled subsequently in a direction which is selectively identical to or opposite to the rotation direction before stopping of rotation of the motor.

For that, it is sufficient to control the closure of the connection which connects winding 13 to source 2 at a time when the voltage V is cancelled out or is increasing in absolute value, with a sign slope which can be chosen respectively identical to or opposite the sign of the slope which was stored. In fact, it is easy to see that the same direction of rotation is maintained if the signs of the slopes at the opening and closure times are identical. On the other hand, the direction of rotation changes if the signs of the slopes at the opening and closure times are opposite.

Here, it is the triac 3 which opens and closes the connection between winding 13 and source 2, at times controlled by the electronic circuit 4 in response both to the AC voltage V and to the signals A, RI and RO. The electronic circuit 4 is here adapted, in response to signal A, to cease applying any signal to the control electrode. The triac, once enabled, will remain so until the end of the half wave in progress, and then will cease conducting. The electronic circuit 4 determines the sign of the slope at the time of opening and stores it.

The electronic circuit 4 is also adapted in this case, in response to the signal RO, to enable the triac 3 the next time voltage V passes through a substantially zero value with a sign slope identical to that stored and, in response to the signal RI, to enable triac 3 the next time voltage V passes through a substantially zero value with a sign slope opposite that stored.

Figure 6:
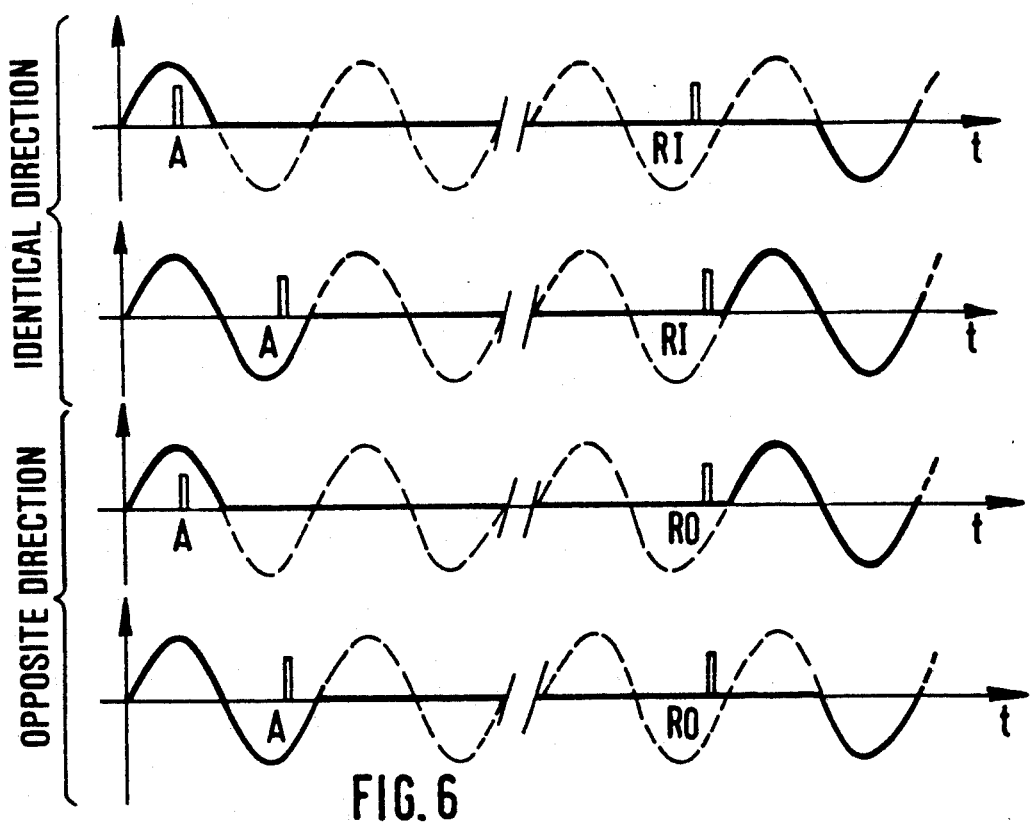
FIG. 6 shows a timing diagram of the signals of the circuit of FIG. 1.

This is shown schematically in the four timing diagrams of FIG. 6. In these Figures, the trend of voltage V has been shown with a broken line and the trend of the voltage effectively applied to winding 13 with a continuous line. The two upper diagrams correspond to setting in rotation in a direction identical to that before stopping, whereas the lower two diagrams correspond to setting in rotation in a direction opposite that before stopping. The pulses represent the signals A, RI and RO.

Naturally, in the case where the time which occurs between the stopping order and effective stopping is not critical, circuit 4 instead of controlling triac 3 so that it opens systematically at the end of the half wave in progress, may control it so that it opens systematically at the next positive half wave end, which may therefore be either that of the half wave in progress or that of the next one. In this case, it is no longer necessary to decide at each opening the sign of the slope for storing, since it is systematically negative. This procedure is quite equivalent to the preceding one. Circuit 4 may also control triac 3 so that it opens systematically at the next negative half wave end, the sign of the slope at opening being then systematically negative.

In the example which has just been described, opening of the winding connection takes place at the time when the current in the winding passes through a zero value. It has already been mentioned that it is necessarily so when a triac is used as switch and that, considering the high resistive component of winding 13, the current in the winding and voltage V are practically in phase, which results in the fact that the time of cancellation of the current is very close to the time of cancellation of the voltage.

If another switch is used instead of a triac, for example a pair of transistors, the time of opening of the connection may be controlled and it is then sufficient to control such opening so that it occurs during any quarter of a period of voltage V which ends by cancellation of the latter, during which quarter of a period voltage V is decreasing in absolute value or is cancelled out.

In so far as the time of closure is concerned, it is always controlled, whether a triac is used or a pair of transistors. It is then sufficient for this time to occur during any quarter of a period of voltage V which begins by cancellation of the latter, during which quarter of a period voltage V is cancelled out or is increasing in absolute value.

Thus, it is possible, with a motor which has just been described, to control the future direction of rotation, relative to the past direction of rotation. However, to completely control the direction of rotation, it is necessary to determine, at least once, an initial direction of rotation. This may be done in the factory and the motor may be delivered with the indication of the initial direction of rotation, so as to make possible the absolute determination of future directions of rotation, or with a device for determining the direction of rotation.

However, and so as to avoid this drawback, the assembly which has just been described may be modified as will now be described with reference to FIG. 7.

Figure 7:
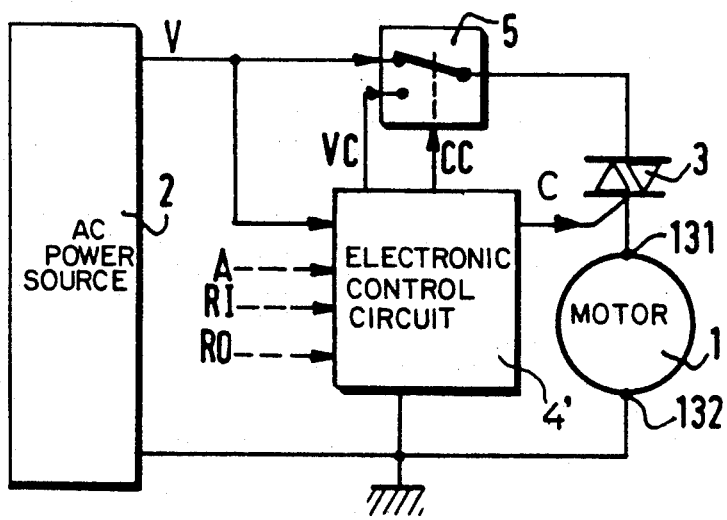
FIG. 7 shows a variant of the circuit of FIG. 1.

In FIG. 7, the triac 3 is connected to the single output of a controllable switch 5 having two inputs. The first input is connected to source 2 whereas the second input is connected to an output of an electronic circuit 4', which output delivers a DC voltage VC, here positive and of 220 V. The electronic voltage 4' replaces circuit 4 of FIG. 1 and, like it, it comprises three inputs receiving the signals A, RI and RO, and an output delivering the signal C controlling triac 3. The electronic circuit 4' is in addition provided with an output delivering a signal CC for controlling switch 5.

In normal operation, the electronic circuit 4' operates like the electronic circuit 4. However, it is adapted so as to apply, before the motor 1 is set in rotation for the first time, the DC voltage VC to winding 13, for a time substantially equal to 20 ms.

This results in necessarily bringing rotor 14 into the first rest position, shown in FIG. 4. In fact, if, before application of the DC voltage of 220 V, rotor 14 was in its first rest position, the 220 V DC voltage will make pole 113 North and pole 122 South, which will cause the rotor to move through the angle α, here positive, of a small value relative to the pole spacing of 72°. As soon as the 220 V DC voltage ceases to be applied, rotor 14 will assume its first rest position. If, on the other hand, before application of the 220 V DC voltage, the rotor was in the second rest position, shown in FIG. 5, the 220 V DC voltage will make pole 113 North and pole 122 South, which will cause rotor 124 to move through angle β, here negative, representing a substantial portion of the pole spacing of 72°. As soon as the 220 V DC voltage ceases to be applied, rotor 14 then assumes the first rest position, shown in FIG. 4.

Thus, the application of the DC voltage makes it possible to reliably pre-position rotor 14 in its first rest position, shown in FIG. 4, from which the sign of the slope of voltage V, after closure of the connection between winding 13 and source 2, imposes the direction of rotation of rotor 14.

In the case where motor 1 is provided for operating with an AC voltage V having an amplitude different from 220 V eff and of a frequency different from 50 Hz, it is sufficient for the DC pre-positioning voltage to have a value comparable to the effective value of voltage V and for its time of application to be comparable to the period of this voltage V. By comparable is meant of the same order of size.

Thus, for the applications where it is considered undesirable to have to detect, at least once, the direction of rotation of the motor of FIG. 1, the motor of FIG. 7 avoids this drawback.

The design of the electronic circuits 4 and 4' for carrying out the functions which have just been described is obviously within the scope of those skilled in the art, and they will not be further described.

It should be noted that, in the embodiment which has just been described, the positive DC voltage VC pre-positions rotor 14 in its first position, shown in FIG. 4. If the DC voltage VC is negative, rotor 14 is then pre-positioned in its second position, shown in FIG. 5.

What is claimed is:

1. A synchronous motor, comprising:
a rotor including a permanent magnet;
a stator having a homopolar field and a winding adapted to be energized by an AC voltage source;
a controllable switch connected on one end to said winding and adapted to be connected on its other end to said source; and
a control circuit for controlling said switch, said control circuit comprising means for generating control signals for causing said switch to open in response to (a) a signal ordering stop rotation of said rotor from a first direction of rotation and (b) an output of said source which is decreasing in absolute value, for causing a sign of the slope of said output of said source to be stored at the time said switch is opened, and for causing said switch to close on response to (c) a signal ordering start rotation of said rotor in a selectable direction relative to said first direction of said rotor, said selectable direction being one of identical to or opposite to said first direction, and (d) an output of said source which is increasing in absolute value and which has a sign of the slope identical to said stored sign when said selectable direction is identical to said first direction and which has a sign of the slope opposite to said stored sign when said selectable direction is opposite to said first direction.

2. The motor as claimed in claim 1, wherein said controllable switch is a triac.

3. The motor as claimed in claim 1, wherein said control circuits comprises means for applying to said winding, before the first time said rotor is set in rotation, a DC voltage of a magnitude comparable to the effective magnitude of said AC voltage, for a time comparable to the period of said AC voltage, for reliably placing said rotor in a given position, wherein the sign of the slope of said AC voltage after closure of said switch imposes the direction of rotation.

4. The motor as claimed in claim 2, wherein said control circuit comprises means for applying said winding, before the first time said rotor is set in rotation, a DC voltage of a magnitude comparable to the effective magnitude of said AC voltage, for a time comparable to the period of said AC voltage, for reliably placing said rotor in a given position, wherein the sign of the slope of said AC voltage after closure of said switch imposes the direction of rotation.

* * * * *